F. W. WODRICH.
APPARATUS FOR FITTING CLOTHES.
APPLICATION FILED DEC. 6, 1918.

1,372,732.

Patented Mar. 29, 1921.
2 SHEETS—SHEET 2.

INVENTOR
Frank W. Wodrich
BY
Miehle & Miehle,
ATTORNEYS

UNITED STATES PATENT OFFICE.

FRANK W. WODRICH, OF EVANSTON, ILLINOIS.

APPARATUS FOR FITTING CLOTHES.

1,372,732.  Specification of Letters Patent.  Patented Mar. 29, 1921.

Application filed December 6, 1918. Serial No. 265,486.

*To all whom it may concern:*

Be it known that I, FRANK W. WODRICH, a citizen of the United States, residing at Evanston, in the county of Cook and State of Illinois, have invented a certain new and useful Improvement in Apparatus for Fitting Clothes, of which the following is a full, clear, concise, and exact description, reference being had to the accompanying drawings, forming a part of this specification.

My invention relates to apparatus for fitting clothes.

The main object of my invention relates to the provision of devices to be used in conjunction with the usual standard patterns for fitting clothes and measurements taken in accordance therewith, whereby abnormalities of the person being fitted, which cannot be recorded and allowed for in making clothes from measurements taken in accordance with the standard patterns, can be quickly and accurately determined both as to disposition and amount.

With this object in view my invention consists in certain features of novelty in the construction, combination and arrangement of parts by which the said object and certain other objects hereinafter appearing are attained, all as fully described with reference to the accompanying drawings and more particularly pointed out in the claim.

Figure 1:
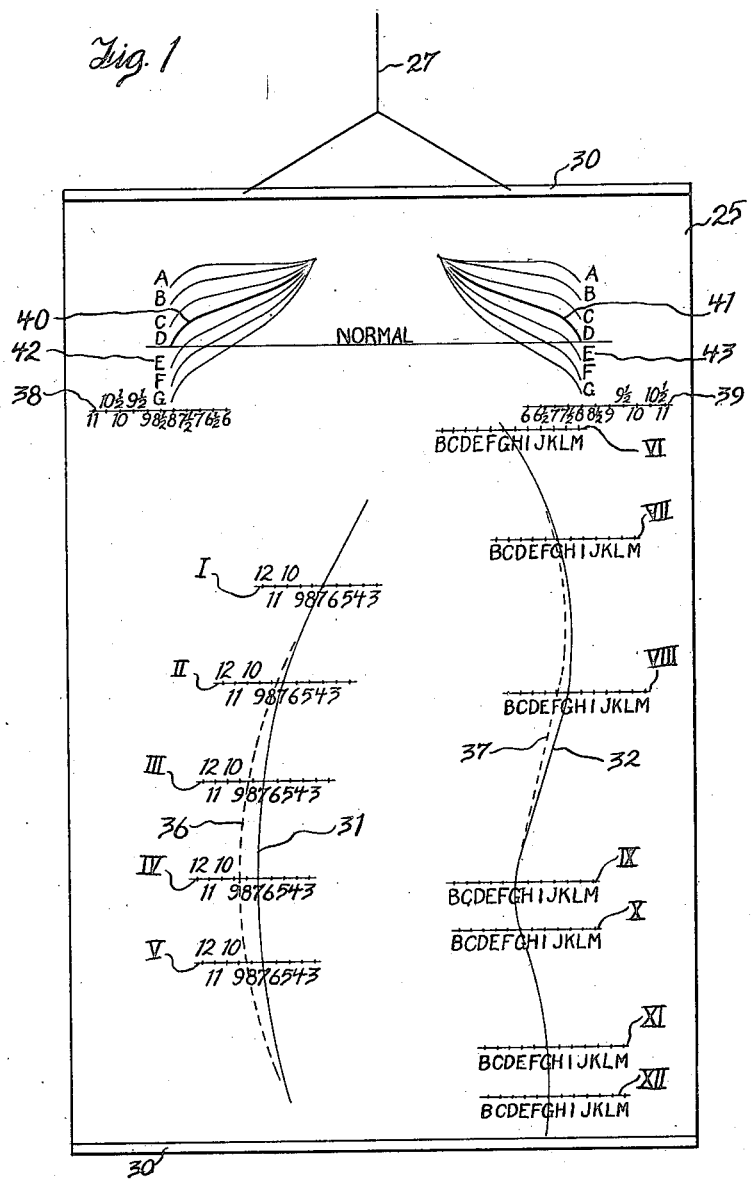
Figure 1 is a front elevation of a chart embodying many of the features of my invention.

In the drawings 25 indicates a rectangular chart suspended in a vertical position upon a support 26 by means of a cord 27 having its one end attached to the upper end of the chart and passing over a pulley 28, secured to the support 26, and having a counterweight 29 attached to the other end thereof. The chart is preferably constructed of flexible material having wood strips 30 attached at the upper and lower ends thereof to retain the chart in flat form when suspended from the cord 27, and the cord 27 is attached to said chart to support the same with the upper and lower sides thereof in horizontal position. The counter-weight 29 is adapted to retain the chart in any vertical position within the limit of the length of cord 27 passing over the pulley 28 for purposes hereinafter described.

Referring to Fig. 1, the front face of the chart is provided with a series of indices I, II, III, IV, and V arranged transversely at different elevations. Each of this plurality of series of indices embraces a similar character, *i. e.*, 7, which similar characters joined successively indicate a contour corresponding to the normal contour 31 of the person to be fitted by the standard patterns, which in the drawings is the normal contour of the front of a person from the chest to the waist.

The front face of the chart is also provided with a second plurality of series of indices, VI, VII, VIII, IX, X, XI, and XII arranged transversely at different elevations on the chart opposite the first series of indices. Each of this plurality of series of indices embraces a similar character, *i. e.*, G, which similar characters joined successively indicate a contour corresponding to the normal contour 32 of the person to be fitted as established by the standard patterns, which in the drawings is the normal contour of the back of a person from the neck to the crotch. The two pluralities of series of indices are so disposed that the normal contours 31 and 32 are disposed vertically and corresponding to the normal contour of the body to be compared horizontally in the same relative positions as they occur on the normal person. In the first plurality of series of indices numbers are placed in spaced relation on either side of the normal characters 7 in numerical order running down from 7 at the right and up from 7 at the left, and in the second plurality of series of indices letters are placed in spaced relation on either side of the normal characters G in alphabetical order running to the letter B at the left and to the letter M at the right. The letters and numbers in the two pluralities of series of indices are spaced to indicate a scale and are spaced correspondingly to the similar characters of their respective plurality of series whereby any set of similar characters in either of the plurality of series may be taken as the normal character of the respective plurality of series. This feature renders the device more convenient as the body need not be shifted to bring the one set of similar characters in registry therewith, and when the two pluralities of series of indices are used in connection with the body both contours may be compared in the one position of the body, whether or not the body is thicker or thinner than the usual body without necessitating shifting the same to compare it with the two pluralities of series of indices whereby the device is rendered more convenient and accurate.

Figure 2:
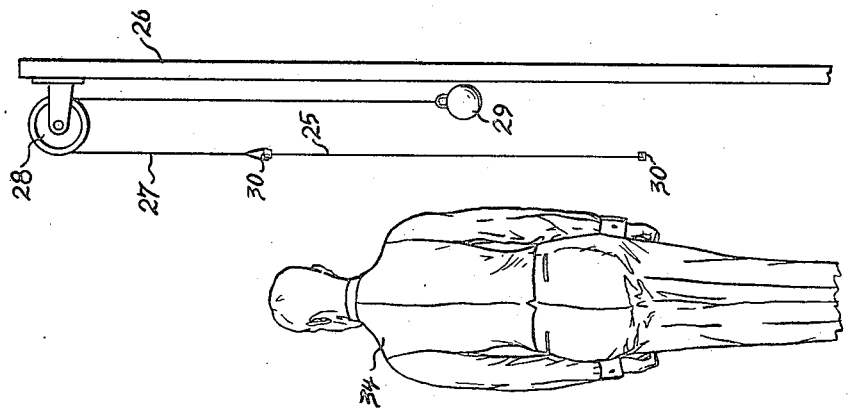
Fig. 2 is a side elevation of the chart on a smaller scale showing the device in operative relation with the body being compared and the eye of the operator.

Fig. 2 shows the manner of using this adaptation of the device. The body to be compared is placed adjacent the front face of the chart with the contour thereof to be compared disposed in a plane parallel with the face of the chart and opposite the indices of the similar normal contour generated thereby. The chart is then adjusted vertically by means of the counter-weighted adjustable suspension hereinbefore described to bring the contour of the body into proper vertical relation with the chart. In the chart the upper index VI of the second plurality of series of indices indicates the collar line of the person whereby the chart may be accurately adjusted, after the operator stands off to bring the chart and body into proper perspective as indicated at 35 in Fig. 2 and notes the characters of the indices through which the contours of the body pass. The dotted lines 36 and 37 in Fig. 1 indicate a typical contour. By these noted characters the contour of the body is immediately apparent and the deviations thereof may be noted and accurately determined by the hereinbefore described spaced relation of the characters in each index.

At the upper end of the chart just above the index VI are two series of indices 38 and 39 spaced from each other and extending in the same direction on the same line. These are for determining the shoulder width and constitute numerical characters spaced to indicate standard measurement and arranged so that the sum of any character in one index with any character of the other index is the dimension between the two in terms of standard measurement. Thus the character 6½ of the index 38 added to the character 8½ of index 39 is 15 which is the dimension between the two characters.

At the extreme top of the chart is a pair of normal contours 40 and 41 which indicate the normal disposition of the shoulder contour of a person. These are spaced from each other to provide for the neck. Associated with the outer ends of respective basic contours 40 and 41 is a pair of series of indices 42 and 43 which indicate in terms of standard measurements computed from the standard patterns aforementioned the variation in the slant of the shoulders of the person to be fitted. Both of these latter devices are compared with the person to be fitted in the same manner as are the indices of the front and back contours hereinbefore described. See Fig. 2.

This device, as aforementioned, is used in connection with the usual measuring method of fitting clothes. Standard patterns are used in connection with this usual measuring method and in supplementing the measuring method with the graphic contour and dimension characteristics obtained through the above devices, allowance is made either in cutting the cloth or in sewing it together whereby a perfect fit may be obtained without actually fitting the articles upon the wearer after they have been basted together and allowing for abnormalities in accordance therewith. Thus a great deal of time is saved and a perfect fit is assured by reason of the fact that the tailor is able to determine easily and quickly those contour and dimension characteristics, both as to size and location, at the beginning of the process of making clothes to order, and not, as is the present method, by cutting the cloth according to the standard pattern in conjunction with the measurements taken, basting the pieces of cloth together, fitting the article upon the person, and afterward permanently sewing the pieces together.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A device for use in conjunction with the usual standard patterns for clothes and measurements in accordance therewith taken from the person to be fitted including a plurality of series of indices disposed at different elevations, a second plurality of series of indices disposed at different elevations, each of said plurality of series of indices embracing similar characters arranged in similar order and spaced correspondingly, each set of similar characters joined successively indicating a contour corresponding to the respective normal contour of the person to be fitted as established by said standard patterns, the similar characters of the one plurality of series of indices providing the contour of one side of the person to be fitted and the similar characters of the second plurality of series of indices providing the contour of the opposite side of the person to be fitted, the two pluralities of series of indices being disposed with relation to each other that the normal contours provided thereby are disposed in proper relation with one another as established by said standard patterns.

In witness whereof I hereunto affix my signature this 2nd day of December, 1918.

FRANK W. WODRICH.